Figure 1:
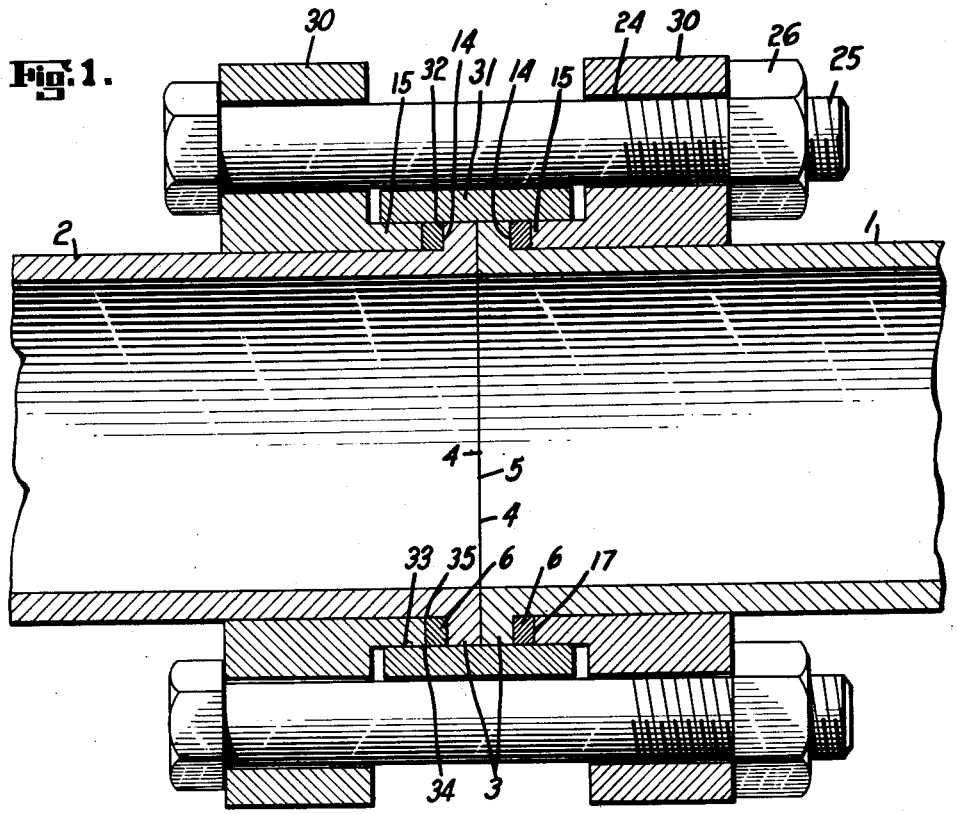

May 21, 1940.  A. HEISTERKAMP  2,201,862

PIPE COUPLING

Filed March 26, 1938

INVENTOR.
Alex Heisterkamp
BY Ernest A. Joerren
ATTORNEY

Patented May 21, 1940

2,201,862

UNITED STATES PATENT OFFICE 2,201,862

PIPE COUPLING

Alex Heisterkamp, Hoboken, N. J.

Application March 26, 1938, Serial No. 198,181

2 Claims. (Cl. 285—140)

The present invention relates to pipe joints and more particularly to joints and couplings for high pressure pipe lines.

Considerable difficulty is experienced with joints for pipe lines having an internal pressure of about one thousand pounds per square inch and upward. In cases where the sealing gasket or packing at the joint is directly exposed to the pressure and the exposed area is equal to about one-half a square inch, the packing is subjected to a direct percentage of about five hundred pounds tending to dislodge the gasket or packing from the joint. Where the gasket is subjected to high pressure either directly or indirectly, small leaks develop at the joint due to vibration, expansion or contraction of the pipes. These leaks are hardly noticeable at first, but increase rapidly because the relatively high pressure in the pipe wears away the packing and enlarges the opening. Where the pipes carry substances at high pressures and temperatures, or chemically active substances, the gaskets deteriorate even more rapidly if a leak develops.

To illustrate, for example, the rapidity with which the leak increases in a pipe having an internal pressure of one thousand pounds per square inch, an opening equivalent to a circular hole of about $\frac{1}{32}$ of an inch in diameter is subjected to a force of .8 pound tending to wear away the gasket and enlarge the leak. If the leak is enlarged to an opening equivalent to a circular hole of about $\frac{1}{16}$ of an inch in diameter, the force is increased to about 3.2 pounds. In other words, the force accelerates in proportion to the square of the ratio of the diameter of the opening. These leaks frequently become serious quite rapidly and must be repaired immediately. This necessitates shut-downs which are inconvenient and costly.

Attempts have been made to overcome the above difficulties by increasing the size of the flanges so that the pipes can be bolted together more securely. An increase in the size of the flanges also increases the weight and cost of the pipes. Also, special types of couplings and joints have been designed but these are objectionable because they cannot be used with standard types of pipes or fittings and are difficult to put together and take apart.

The present invention aims to overcome the above difficulties and objections by providing a simple inexpensive coupling adapted particularly for pipes subjected to high pressure. The invention further aims to provide an improved coupling which is light in weight and can be readily used with standard pipe fittings.

An object of the present invention is to provide a coupling forming a substantially rigid joint which minimizes leaks caused by vibration, expansion or contraction of the pipes.

Another object of the invention is to provide a coupling having a pair of packing gaskets or sealing members out of direct contact with the pressure in the pipes.

Another object of the invention is to provide a coupling having a housing for the sealing members which shields the sealing members from direct pressure to prevent the formation or rapid aggravation of leaks.

Another object of the invention is to provide a coupling having a housing for the packing gasket which reinforces the gasket to prevent it from being displaced.

Another object of the invention is to provide a coupling adapted to seal a joint at a plurality of sealing zones.

Another object of the invention is to provide a coupling which is relatively light in weight and is particularly adapted for marine, aeronautical or other purposes where fittings which are strong but light in weight are desirable.

Another object of the invention is to provide a coupling suitable for pipe lines carrying chemically active or corrosive materials.

A further object of the invention is to provide a coupling which eliminates electrolysis in pipes used for carrying chemically active materials.

Other and further objects of the invention will be obvious upon an understanding of the illustrative embodiment about to be described, or will be indicated in the appended claims, and various advantages not referred to herein will occur to one skilled in the art upon employment of the invention in practice.

Figure 2:
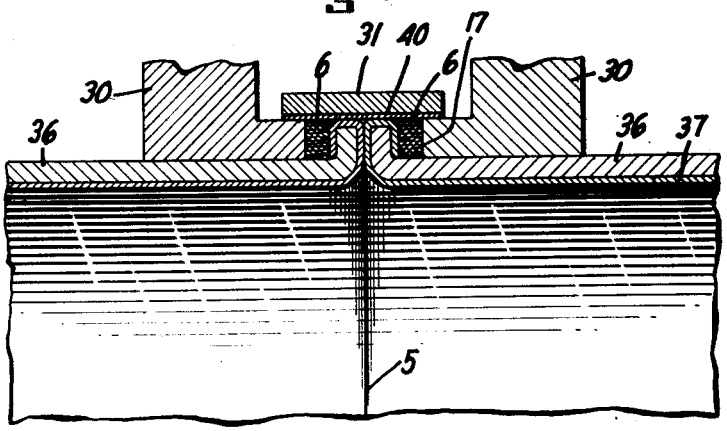

A preferred embodiment of the invention has been chosen for purposes of illustration and description and is shown in the accompanying drawing, forming a part of the specification, wherein Fig. 1 is a sectional view illustrating an embodiment of the invention; and Fig. 2 is a fragmentary sectional view illustrating an embodiment of the invention applied to a pipe lined with non-corrosive materials.

Referring more particularly to the drawing, there is shown a pipe 1 and a pipe 2 each having an annular outwardly extending flange 3. The flanges of pipes 1 and 2 are substantially equal in diameter and each have a surface 4 facing the other in abutting relation to form a joint 5 between the pipes 1 and 2.

The joint is adapted to be sealed by gaskets 6 or other suitable sealing members which are held in place by coupling members 30 mounted on pipes 1 and 2 respectively, in a suitable manner as will be described in detail hereafter. The gaskets engage the flanges 3 at seats 14 at the opposite side of the surface 4 forming the joint. The gaskets may be circular or rectangular in cross-section and have an inner diameter substantially equal to the outer diameter of the pipes and when compressed have an outer diameter substantially equal to the outer diameter of the flanges 3. The gaskets may be formed of any suitable material including rubber, asbestos, fibre, spun glass or other compounds.

The coupling members 30 are alike and thereby simplify the manufacture of the parts required for the coupling. Each of the members 30 has a rigid tubular sleeve portion 15 about which a rigid tubular member or ring member 31 may be telescoped. The sleeve portion 15 is provided with an annular end surface 17 disposed at substantially right angles to the pipe and adapted to cooperate with the seat 14 on the pipe flange to compress the gasket.

The ring member 31 has an inner diameter substantially equal to the outer diameter of the tubular portions 15 and the flanges 3, and extends endwise beyond the flanges and in telescoping relation with the tubular portions 15. In this manner the end surface 17, the outer surface of the pipe, the inner surface of the ring member 31 and the seat 14 of the pipe flange cooperate to provide a closed annular recess or housing for the gasket 6, which is rectangular in cross-section. The ring member 31 is of suitable thickness and rigidity to withstand compression of the gaskets and to provide a rigid coupling when telescoped over the sleeves 15 of the coupling members.

The coupling members are provided with bolts 25 and nuts 26 adapted to be threaded thereon to draw the coupling members towards each other and compress the gaskets within the housing. When the gaskets are compressed, they form a seal between the flanges and the inner surface of the ring at 32, a seal between the inner surface 33 of the ring and the tubular portions 15 at 34, and a seal between the tubular portions 15 and the outer surface of the pipe at 35. The seal 32 checks any pressure escaping at the joints, while the seals 34 and 35 prevent the escape of pressure in case a leak develops at the sealing zone 32.

Furthermore, the housing supports the gasket at four sides thereof to prevent the gasket from being displaced or distorted by pressure within the pipes. When the gasket is compressed, the corners of the gasket are forced into the corners of the recess or housing.

In Fig. 2, the invention is shown applied to pipes 36 which are lined or plated at the interior thereof with a non-corrosive metal 37 such as lead, "Monel" metal or other metals adapted to resist chemically active materials. Preferably, surface 4 of the flanges, the outer periphery of the flanges, and the seat portions 14 of the flanges are also lined or plated. A pair of coupling members 30 and a ring member 31 preferably are utilized for compressing the gaskets to seal the joint. The inner surface of the ring member 31 preferably is coated with metal 40 corresponding to the metal utilized for coating or lining the pipes. By constructing the ring and pipe flanges in the above manner, the pipes may be utilized for conveying chemically active materials without danger of electrolysis or other harmful reactions between different metals utilized for constructing the parts of the coupling. In the present case, if slight leaks occur at the joint 5 and the chemically active materials seep between the flanges and the ring, no electrolysis will occur. This is very advantageous because electrolysis at the joint would rapidly impair the seal and cause the material within the pipe to escape.

It will be seen that the present invention provides an inexpensive coupling for sealing joints adapted to withstand relatively high pressures and temperatures or chemically active substances. The coupling forms a substantially rigid connection at the joint and thereby minimizes the tendency of vibrations to cause leaks. Due to the strength of the coupling and the effectiveness of the seal, lighter tubing can be used in place of heavy pipes. The couplings can be attached and secured very easily without special tools or welding. Also, an entire piping installation can be pre-fabricated to exact dimensions, which makes it possible to install the piping by starting at different points. Also, in order to make repairs, it is possible to remove a single pipe from the system without disturbing the rest of the system. The coupling is so designed that the bolts are exposed to the cooling action of the surrounding air to reduce the temperature thereof which is advantageous and desirable where extreme heat is encountered.

Due to the coupling forming a primary and secondary seal, serious leaks will not develop because the secondary seal seals the leaks in the primary seal. Consequently, frequent repairs will not be necessary. The coupling is very desirable for pipe lines, hundreds of miles long, which are used for pumping oil from the oil fields to the refinery, because frequent inspection and repair of such lines are not feasible. The coupling is also suitable for marine, aeronautical or other installations, where bulky or heavy fittings are objectionable.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:
1. A rigid pipe joint adapted to withstand high pressures at high temperature, comprising a pair of rigid pipes each having a rigid end flange abutting the other, said flanges being provided with a cylindrical outer peripheral surface and with an annular surface disposed at right angles to said pipe; a rigid tubular member having a cylindrical inner peripheral surface closely encircling the cylindrical surfaces of said flanges and having portions extending endwise beyond each of said flanges; a rigid coupling member on each of said pipes having a rigid cylindrical tubular sleeve portion telescoped in closely fitting relation between said pipe and an endwise extending portion of said tubular member, said sleeve portions each having an annular end surface disposed at right angles to said pipe and cooperating with the outer surfaces of a pipe, the inner surface of said tubular member and the annular surface of a flange to provide a closed rectangular recess; an annular gasket, rectangular in cross-section, closely fitting in each of said recesses; and means for moving said coupling members towards each other whereby the end surfaces of said tubular portions compress said gaskets against the annular surfaces of said flanges and cause the corners of said gaskets to be forced into the corners of said recesses.

2. A rigid pipe joint adapted to withstand high pressures at high temperature, comprising a pair of rigid pipes each having a rigid end flange abutting the other, said flanges being provided with a cylindrical outer peripheral surface and with an annular surface disposed at substantially right angles to said pipe; a rigid tubular member having a cylindrical inner peripheral surface closely encircling the cylindrical surfaces of said flanges and having portions extending endwise beyond each of said flanges; a rigid coupling member on each of said pipes having a rigid cylindrical tubular sleeve portion telescoped in closely fitting relation between said pipe and an endwise extending portion of said tubular member, said sleeve portions each having an annular end surface disposed at right angles to said pipe and cooperating with the outer surfaces of a pipe, the inner surface of said tubular member and the annular surface of a flange to provide a closed substantially rectangular recess; an annular gasket, substantially rectangular in cross-section, closely fitting in each of said recesses; and means for moving said coupling members towards each other whereby the end surfaces of said tubular portions compress said gaskets against the annular surfaces of said flanges and cause the corners of said gaskets to be forced into the corners of said recesses; said pipes being lined with a non-corrosive material extending to the outer peripheries of said flanges and said tubular member having its inner surface lined with the same material as said pipes to prevent electrolysis between said pipes and said tubular member.

ALEX HEISTERKAMP.